Jan. 20, 1942. J. M. WITHEY 2,270,487
FISH BAIT
Filed Sept. 15, 1939
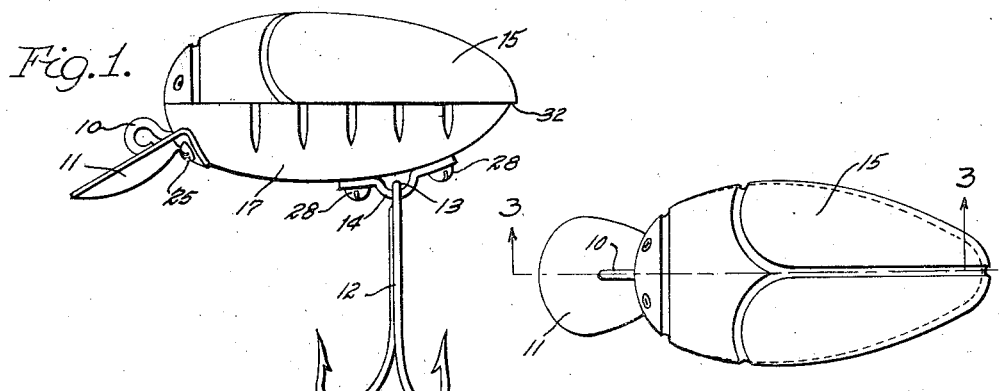
Fig. 1.
Fig. 2.
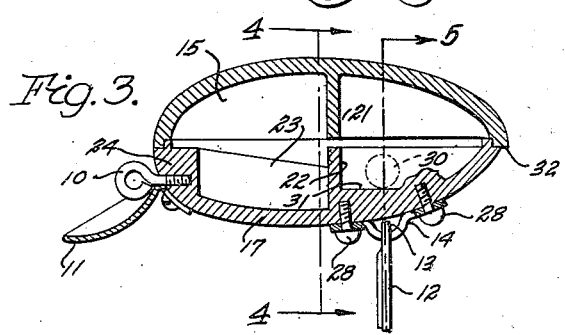
Fig. 3.
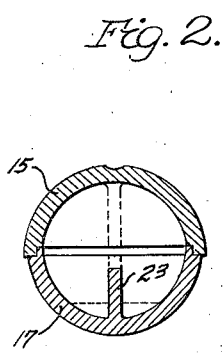
Fig. 4.
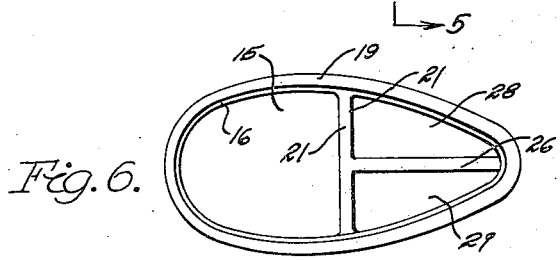
Fig. 6.
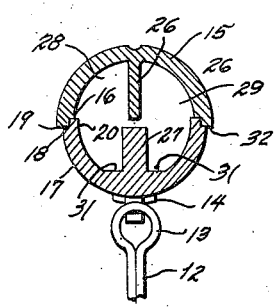
Fig. 5.
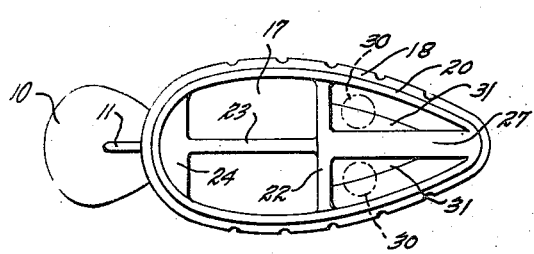
Fig. 7.
Inventor
John M. Withey,
By 
Attorney

UNITED STATES PATENT OFFICE 2,270,487

FISH BAIT

John M. Withey, Howell, Mich.

Application September 15, 1939, Serial No. 295,120

2 Claims. (Cl. 43—46)

This invention relates to a new and useful improvement in fish baits, and in particular to baits which emit vibrations through the water when retrieved.

Although it is generally believed that fish do not have auditory organs and hence do not hear in the manner of humans, nevertheless, it is a matter of common observation that fish are affected by vibrations travelling through water which, to humans, are of audible frequency. Ordinarily fishermen have endeavored to avoid all noise on the theory that noise will "scare" fish. In the present invention, however, the bait comprises a chambered body, one or more chambers containing shot which vibrate against the side of the bait while the latter is being retrieved. The resultant vibrations produce a startling and unexpected effect on fish. The vibrations attract the attention of the fish. Once their attention is attracted they appear to strike harder and more forcefully than is the case with ordinary baits. Accordingly this bait results in more frequent and more thrilling strikes than usual and also increases the number of catches since the harder the strike the more securely the hook is embedded in the fish.

Accordingly it is a principal object of this invention to provide a fish bait which will emit vibrations having the effect heretofore discussed.

Another object of the invention is to provide a bait having a construction promoting proper casting and retrieving.

A further object of the invention is to provide weights within the interior of the bait which will vibrate against the sides of the body and will further provide a proper distribution of mass to insure proper casting.

Still another object of the invention is to provide a plurality of chambers within the interior of the bait, one or more of which may contain shot.

It is a further object of this invention to provide a flat portion along the bottom of one or more of the chambers to prevent the shot becoming wedged therein and thus avoid stopping the vibrations.

Another object of the invention is to provide a water-tight joint between the two halves of the hollow body of the bait.

A further object of the invention is to provide an overhanging surface on the upper half of the bait which will assist in the planing action of the bait through the water.

Other and further objects and advantages of the invention will become apparent by reference to the following description and accompanying drawing in which—

Figure 1 is a side elevation of the bait;

Fig. 2 is a top elevation of the same;

Fig. 3 is a section taken approximately along the line 3—3 of Fig. 2;

Fig. 4 is a section taken along the line 4—4 of Fig. 3;

Fig. 5 is a section taken along the line 5—5 of Fig. 3;

Fig. 6 is a plan view of the top half of the bait before assembly looking inwardly from the parting plane;

Fig. 7 is a plan view of the bottom half of the bait before assembly looking inwardly from the parting plane.

One particular bait to which applicant has applied his invention has the general exterior contour of a beetle, and it is provided with surface decoration and markings emblematic of a beetle. To the bait are attached fittings such as an eye 10, a diving plate 11, and a hook 12 having an eye 13 which is secured to the bait by means of a bracket 14.

The bait itself is made of two halves which are joined together along a longitudinal, horizontal parting plane. When joined together the two halves comprise a hollow, water-tight chamber having comparatively thin walls. The upper half 15 is formed with a rabbet 16 along the inner part of the parting edge. The lower half 17 is formed with a rabbet 18 along the outer part of the parting edge. This results in upstanding ridges 19 and 20 along the parting edges of both halves which fit into corresponding rabbets 18 and 16 in the opposite halves. This feature assists in formation of a water-tight joint along the parting edge.

This particular bait is made of a plastic composition and molded to proper form. The upper and lower halves may be joined by dipping one or both parting edges in a suitable softener such as acetone and pressing the two halves together. Upon evaporation of the softening agent the parts will be securely joined together in a water-tight joint. It should be understood, however, that my invention is by no means limited to the particular materials aforementioned, but the vibration principle may be extended to include a wide variety of materials, shapes of bait, etc.

A transverse rib 21 extends across the top half of the bait and there is likewise a transverse rib 22 extending across the lower half so that when the two halves are joined the two ribs are coplanar, although there is a slight space between the two. The bottom half 17 has a longitudinal rib 23 extending forwardly of the transverse rib 22. There is a thickened portion 24 at the forward part of the bottom half 17, designed to receive the screw eye 10 and the screws 25 which hold the diving plate 11. Hence the screws do not extend through the walls of the bait, and hence there is no chance for water to enter through the holes which receive the screws.

The top half 15 has a longitudinal, vertical rib 26 extending rearwardly of the transverse rib 21. The bottom half 17 likewise has such a longitudinal, vertical rib 27, but this rib is of thickened cross-section and is adapted to receive the screws 28 holding the bracket 14 in place in a manner and with a function similar to that of the thickened portion 24. The rear longitudinal ribs 26 and 27 are approximately coplanar and hence divide the rear half into right and left quarters 28 and 29 which comprise separate chambers, although there is space between the upper rib 26 and the lower rib 27 as indicated in the drawing (especially Fig. 5).

In each of the quarters is placed a round shot 30, such as a BB shot. To prevent the shot wedging between the side wall and the rib 27, each of the lower quarters is provided with a flat platform 31 upon which the shot rolls. The shot may strike against the transverse ribs 21 and 22 or against the back of the chambers or the sides of the chambers. This imparts a vibration which carries through the water. As the bait is retrieved after casting it twists from side to side and bobs up and down. It is also customary for fishermen to retrieve baits of this general nature by jerking the same toward the angler with unconstant velocity. All this uneven movement causes the shot to roll about and vibrate against the sides of the body and ribs.

It will be observed that the upper half of the bait overhangs the lower half in the rearward portion. This is intended as a simulation of the actual position of the folded wings of a beetle. The overhang also provides a horizontal surface 32 which assists in the planing action of the bait as retrieved through the water.

The presence of the shots in the bait improves the casting action by properly placing the center of gravity of the bait toward the rear. The movement of the shot within the body of the bait further causes irregular movement of the bait through the water on retrieving, and this effect is particularly desirable since it is known that this increases the tendency of game fish to strike. The shot also acts as a stabilizer to keep the bait right side up. Hence the shot performs several functions in addition to setting up vibrations.

The bait is so designed with respect to displacement and weight that the bait will float on top of the water when not in motion. However, when being retrieved through the water the action of the diving plate 11 is such that the bait will dive under water and will dip up and down as the speed with which the bait is retrieved is varied. If it is desired that the bait sink below the surface even when not in motion, then additional weights may be placed in the body, in any of the ways well known in the art.

It should be noted that applicant does not desire to confine himself to the actual structure heretofore described for the reason that the vibration principle may be applied to nearly all types of artificial lures. The actual bait therefore described is made of a plastic composition. However, a wide variety of materials might be employed, such as metal, glass, Celluloid, hard rubber, or, in fact, any material which is suitable for a fish bait and will act as a proper sounding material for the shot. Furthermore, the actual details of structure may be varied widely without departing from the spirit of the invention. The shape and position of the chambers, the position of the shot, the shape of the body, all might be designed somewhat differently. However, applicant has found the lure above described particularly effective.

Having thus fully set forth the invention, what I claim is:

1. In a fish bait, a chambered body, a flat, substantially vertical interior wall of said chambered body comprising a sounding board, and a hard particle loose within said chambered body and co-operable with said sounding board to produce vibrations.

2. In a fish bait, a chambered body, an interior wall of said chambered body comprising a sounding board, a horizontal flat platform along a portion of the bottom of said chambered body, and a hard particle loose within said chambered body and co-operable with said sounding board to produce vibrations.

JOHN M. WITHEY.